Patented Nov. 4, 1952

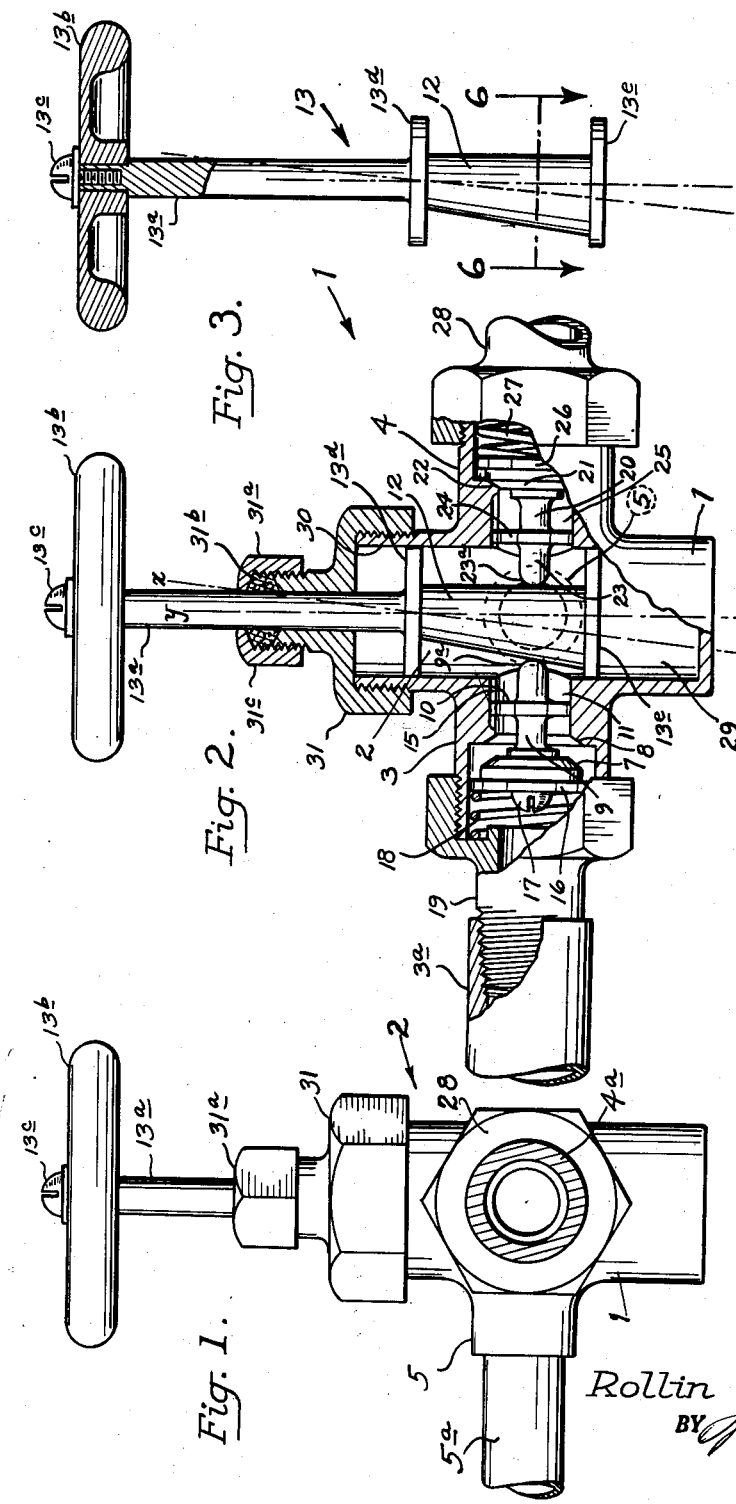

2,616,710

UNITED STATES PATENT OFFICE 2,616,710

MIXING FAUCET

Rollin W. Woodruff, Portland, Oreg.

Application September 26, 1947, Serial No. 776,211

3 Claims. (Cl. 277—20)

My invention relates to mixing valves and, specifically, to valves of the type adapted to regulate the temperature and volume of water discharged from a common outlet. That is to say, one of the specific objects of my invention is to provide an inexpensive, simple mixing valve which will regulate not only the volume of water discharged from the outlet thereof, but also to regulate the amount of cold and hot water admitted to said mixing valve, thus to regulate the temperature of the discharged water.

A further and more specific object of my invention is to provide a valve of this character which has a single operating handle, which may regulate the temperature of the water discharged, as well as the volume thereof.

Further and other features of my invention and the construction and mode of operation thereof are hereinafter described with reference to the accompanying drawings, in which:

Fig. 1 is an elevation of a mixing valve embodying my invention, taken in the direction of the arrow 1 in Fig. 2;

Fig. 2 is an elevation taken in the direction of the arrow 2 in Fig. 1, with portions shown broken away to disclose details of the mechanism which would otherwise be concealed;

Fig. 3 is an elevation of the valve control unit detached from the body of the valve, portions thereof being shown in section to disclose details of construction;

Fig. 4 is an elevation of one of the valves for controlling the inflow of water to said mixing valve;

Fig. 5 is an end view of said valve; and

Fig. 6 is a sectional view taken on the line 6—6 in Fig. 3, through the eccentric truncated conic section of the valve control unit for varying the relative volumes of water to control the discharge temperature of the intermixture.

A mixing valve embodying my invention comprises a body 1, which is hollow and defines an internal chamber 2. Leading into said chamber and communicating therewith are a cold water inlet 3, a hot water inlet 4, and a discharge outlet 5. Said inlets, respectively, and said outlet are shown communicating with conduits 3a, 4a and 5a, respectively. It is to be understood that the discharge outlet might well be a spigot, shower head, or other type of discharge. Also, although I have referred herein to said inlets as for cold water and for hot water, I use these terms merely for the purpose of illustration. That is to say, a mixing valve embodying my invention might well be used for mixing any two fluids where the relative mixture and the volume of the discharge have to be regulated and controlled.

Housed within the cold water inlet is a spring closed valve 6, having a tapered and preferably resilient washer 7 adapted to seat in a valve seat 8. Said valve seat and said washer preferably have complementary tapers so as to assure a tight seal at this point. A valve stem 9 extends laterally from the washer and carries an apertured member such as a spider 10, which engages and guides the valve as it is seated and unseated. The periphery of said spider engages the bore of the passageway 11 leading from the chamber to the cold water inlet 3.

The end 9a of said valve stem is rounded in one plane and is flat in a plane normal thereto. Thus, the valve stem 9 terminates in a lateral straight line which is perpendicular to the longitudinal axis thereof (see Fig. 4). Said end bears upon a truncated conic section 12 of the valve control unit 13, which reciprocates, as well as rotates, within the chamber 2. Said valve 6 is held against rotation by means of a key 14 extending radially therefrom. Said key is preferably a prolongation of one of the radial spider legs and engages a keyway 15 in said passageway 11. It is desired that the end 9a ride on the periphery of the conic section, so that the flatwise dimension will extend tangentially to said conic section and at right angles to the path of reciprocation of the valve control unit 14. That is, the path or axis of reciprocation is perpendicular to the lateral straight line on the terminal end of the valve stem 9.

A head 16 is provided for said valve, which has radially disposed projections 16a bearing on the bore of the cold water inlet 3. Said sliding engagement of said projections with the bore of said cold water inlet causes the valve to move coaxially with said bore and with the passageway 11, and yet permits the ready flow of fluid through the aperture or interstices of the head and of the spider, respectively. A screw 17 holds said head in place, and a coiled spring 18 bears against said head and against the coupling 19 on said cold water inlet, urging said valve into seating relationship with the valve seat 8. The valve is opened by the configuration of the valve control unit, and particularly the truncated conic section thereof, and tends to be closed by the compression of said spring 18. Thus said valve 6 is moved toward the left, as viewed in Fig. 2, by the movement of the valve control unit 13, and is moved toward the right by the compression of the coil spring 18.

The parts for controlling the flow of hot water from the inlet 4 are similarly arranged. A valve 20, having a washer 21, seats upon seat 22. It is provided with a valve stem 23, having a flattened end 23a. It is guided by a spider 24 in a passageway 25, and said valve bears against the conic section 12, which is common to both control vales. A similar key engages a keyway in said passageway 25 to prevent rotation of the valve 20. It is provided with a head 26, which is apertured, and is urged toward the left, that is into engagement with the truncated conic section, by a coil spring 27. Coupling 28 joins the hot water outlet 4 to its conduit 4a.

Extending normal to said inlets, as is shown in Fig. 2, is a well 29 and a cylindrical guide 30 extending in opposite directions from the chamber 2. The valve control unit has a stem 13a, having a handle 13b at the end thereof, preferably removable and held in position by a screw 13c. Annular guides 13d and 13e are arranged at the ends of the truncated conic section 12 and bear in the bores of said guide and the well, respectively, to hold the reciprocal movement of the valve control unit 13 within close limits. A bonnet 31 caps the end of the guide 30, and if fluids under high pressure are being controlled, a stuffing gland 31a, having packing 31b and a packing nut 31c prevents leakage about the stem 13a of said valve control unit.

As is shown in Fig. 2, the axis of rotation $x$—$x$ of the truncated conic section is arranged angularly with respect to the axis of rotation $y$—$y$ of the valve control unit generally. Said axes intersect substantially at the upper end of the conic section adjacent the guide 13d. Said axes are spaced widely adjacent the guide 13e. Thus the axis $x$—$x$ gyrates about the axis $y$—$y$ at the bottom and at the point where section 6—6 is taken. In said latter figure, said axes are shown as points and marked $x$ and $y$, respectively. Said truncated conic section may thus be described as being eccentric with respect to the remainder of the valve control unit 13. Due to said eccentricity, where the handle is turned, it causes a relative movement of the valves 6 and 20, respectively, and a corresponding variance in opening of said valves with their seats. The cross-sectional area of the ports controlled by said valves thus varies, and the admitted volumes of liquid which flow therethrough will vary correspondingly.

Said section 12, being conic, also causes said valves to be opened and closed, respectively, as said valve is lifted up, as viewed in Fig. 2, and lowered, respectively, as illustrated in said figure. In operation, therefrom, the volume of fluid discharged from the outlet 5 may be increased by lifting said valve control unit to space the valves 6 and 20 apart and cause them to move further from their respective seats. Pushing said handle down will produce a corresponding diminishment in volume of admitted fluid, the valves being moved toward their seats by the compression of the coil springs 18 and 27, inclusive. It is thus evident that the volume of the discharge through the discharge outlet 5 may be varied by shifting said valve control unit 13 laterally upon its path transversely of the chamber 2, and the relative volume of fluid admitted through the cold water inlet and the hot water inlet may be varied by rotating said valve control unit about its axis $y$—$y$.

Due to the eccentricities of the conic section 12, the ends 9a and 23a of the valve stems 9 and 23, respectively, must have some substantial flat width if they are always to stand tangential to the maximum outline of said section 12. Thus, the lateral straight line, with which each stem terminates, must have some substantial length. This length must be at least as great as the maximum eccentric spacing of the axes $x$—$x$ and $y$—$y$ within the valve control unit. To state it another way, if point contact only were maintained by said ends, they would bear on said conic section at points within said maximum outline, since said ends do not extend truly radial to the oblique axis $x$—$x$. By making said ends flat, and of a width equal to or greater than the degree of eccentricity of said axis at the point of contact with said valve ends, the effective openings of the valves are maintained true, and the relative mixture is not varied when said conic section is moved along the path traversed by the valve control unit as it is moved in and out by the handle 13b. Thus when said conic section is rotated and the desired temperature is adjusted, a change in volume will not affect the relative temperature of the discharged water.

I claim:

1. In a mixing valve comprising a body defining an internal chamber, hot and cold water inlets, respectively, and a discharge outlet, said inlets and said outlets communicating with said internal chamber, valves, respectively, for said hot and cold water inlets controlling the flow therefrom, said valves being spaced apart, a valve control unit operatively arranged to actuate both of said valves, said valve control unit being mounted for reciprocal action in said body traversing a path extending intermediate said valves for varying the volume of water discharged from said outlet, and said valve unit having a rotatable valve section defining a truncated conic section eccentric with respect to the path of reciprocation of said valve control unit, said valve section engaging said valves to vary the relative volume of water admitted through the hot and cold water inlets, respectively, the ends of said valves making contact with said conic section being of sufficient width to always stand tangential to the maximum outline of said conic section.

2. In a mixing valve comprising a body defining an internal chamber having a plurality of inlets, respectively, and a single discharge outlet, said inlets and said outlet communicating with said internal chamber, valves, respectively, for said inlets for controlling a flow therefrom, said valves being spaced apart, the valve control unit operatively aranged to actuate both of said valves, said valve control unit being mounted for reciprocal action in said body traversing a path extending intermediate said valves for varying the volume of fluid discharged from said outlet, said valve unit having a rotatable valve section defining a truncated conic section eccentric with respect to the path of reciprocation of said valve control unit, said valve section engaging said valves to vary the relative volumes of fluid admitted through said inlets, respectively, the ends of said valves making contact with said conic section being of semi-cylindrical section laterally to always stand tangential to the maximum outline of said conic section.

3. A mixing valve, comprising a body having a mixing chamber, two inlets and an outlet communicating with said chamber, a valve mounted for reciprocation in each inlet and carrying an elongated actuating stem protruding into said chamber, each said stem terminating in a lateral straight line which is perpendicular to the longitudinal axis of the corresponding stem, an actuating member mounted for reciprocation in said chamber on an axis perpendicular to both said actuating stems and to each of said lateral straight lines, and a truncated conic valve control unit carried by said actuating member rotatable about an axis eccentrically inclined with respect to and intersecting said reciprocation axis and have the conic surface thereof bearing on said valve stem lateral straight lines, each said lateral straight line being of a length at least as great as the maximum eccentric spacing of said axes within said conic valve control unit.

ROLLIN W. WOODRUFF.

REFERENCES CITED

The following references are of record in the file of this patent:

UNITED STATES PATENTS

| Number | Name | Date |
| --- | --- | --- |
| 742,327 | Huye | Oct. 27, 1903 |
| 1,293,003 | Bergens | Feb. 4, 1919 |
| 1,326,247 | Zengel | Dec. 30, 1919 |
| 2,301,439 | Moen | Nov. 10, 1942 |